United States Patent [19]

Granger et al.

[11] Patent Number: 5,528,505
[45] Date of Patent: Jun. 18, 1996

[54] POSITION-MARKING METHOD FOR A MACHINE THAT MEASURES IN THREE DIMENSIONS, AND APPARATUS FOR IMPLEMENTING THE METHOD

[75] Inventors: Romain Granger, Montoire, France; Homer Eaton, Carlsbad, Calif.

[73] Assignee: Romer, Montoire, France

[21] Appl. No.: 308,304

[22] Filed: Sep. 19, 1994

[30] Foreign Application Priority Data

Sep. 20, 1993 [FR] France ................................ 93 11157

[51] Int. Cl.⁶ .......................... G06F 19/00; G05B 19/18
[52] U.S. Cl. ................... 364/474.37; 364/474.28; 364/167.01; 318/568.16; 395/86
[58] Field of Search ................ 364/167.01, 474.03, 364/474.05, 474.37, 474.28; 318/568.16, 577; 901/9, 15, 46; 395/80, 86, 93, 94, 97

[56] References Cited

U.S. PATENT DOCUMENTS

| | | | |
|---|---|---|---|
| 3,279,079 | 10/1966 | Schiler | 33/179 |
| 3,636,635 | 1/1972 | Lemelson | 33/174 |
| 3,774,311 | 11/1973 | Stemple | 33/174 R |
| 3,774,312 | 11/1973 | Esch | 33/174 L |
| 3,944,798 | 3/1976 | Eaton | 33/174 PC |
| 4,453,085 | 6/1984 | Pryor | 250/203 R |
| 4,575,802 | 3/1986 | Walsh et al. | 364/167.01 |
| 4,821,207 | 4/1989 | Ming et al. | 364/193 |
| 4,894,788 | 1/1990 | Stelzer | 364/474.35 |
| 4,954,762 | 9/1990 | Miyake et al. | 318/568.19 |
| 5,380,978 | 1/1995 | Pryor | 219/121.64 |

FOREIGN PATENT DOCUMENTS

| | | |
|---|---|---|
| 0188623 | 7/1985 | European Pat. Off. . |
| 0511396 | 11/1991 | European Pat. Off. . |
| 2597969 | 10/1987 | France . |
| 1498009 | 1/1987 | United Kingdom . |

OTHER PUBLICATIONS

Proceedings 1987 IEEE International Conference on Robotics and Automation, vol. 2, Apr. 1987, Raleigh, North Carolina, USA pp. 807–815 C. H. Chen, A. C. KAK, 'Modeling and calibration of a structured light scanner for 3-D robot vision'.

*Primary Examiner*—Paul P. Gordon
*Attorney, Agent, or Firm*—Sixbey, Friedman Leedom & Ferguson; Gerald J. Ferguson, Jr.; Tim L. Brackett, Jr.

[57] ABSTRACT

The contact sensor of the hinged arm of a measurement machine for taking measurements in three dimensions is replaced by a light sensor secured at the same position. A first position-marking axis defined by a light beam emitted by an emitter disposed in a first position is used to determine a first vector by two measured points. The emitter is moved in a plane so as to take up a second position, and a second position-marking axis defined by the light beam of said emitter is used by measuring a point on the second axis. The projection $[O_1]$ of the second axis point onto the first position-marking axis is then used to enable a frame of reference $[O_1X, O_1Y, O_1Z]$ to be established. If the machine needs to be displaced in order to take measurements in a zone that is further away, a new frame of reference is determined using the same steps, using the same first axis and using a new point on another second axis that is obtained by a new displacement of the emitter performed so that it remains in the same plane, thereby enabling the origin $[O_2]$ of the new frame of reference to be determined, thus making it possible to make available a plurality of known frames of reference.

11 Claims, 4 Drawing Sheets

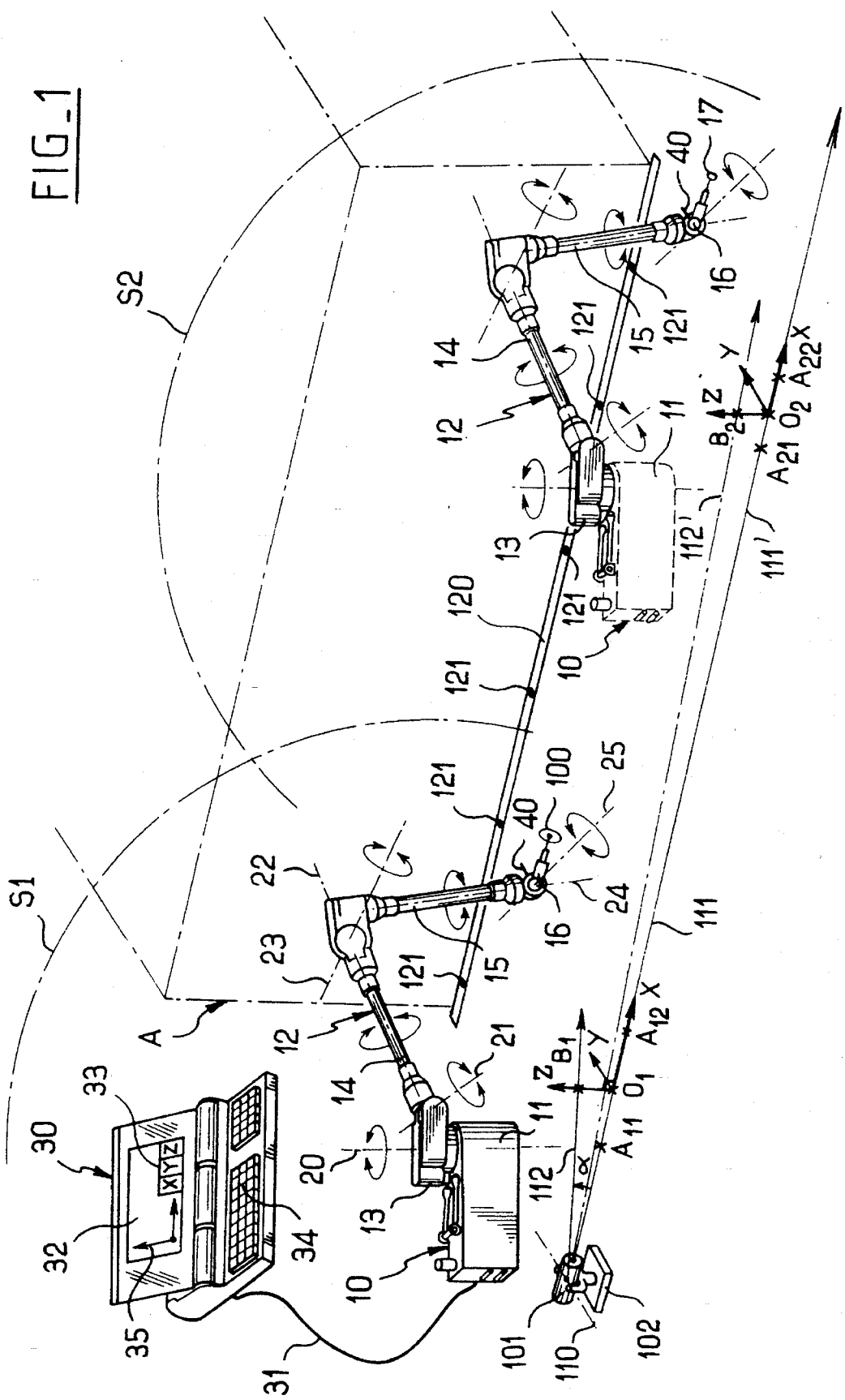

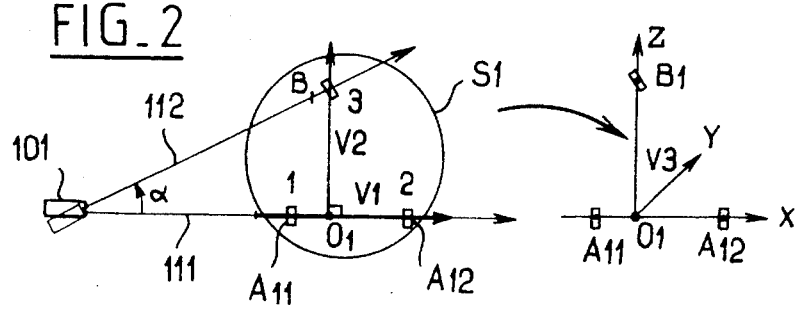
FIG_2
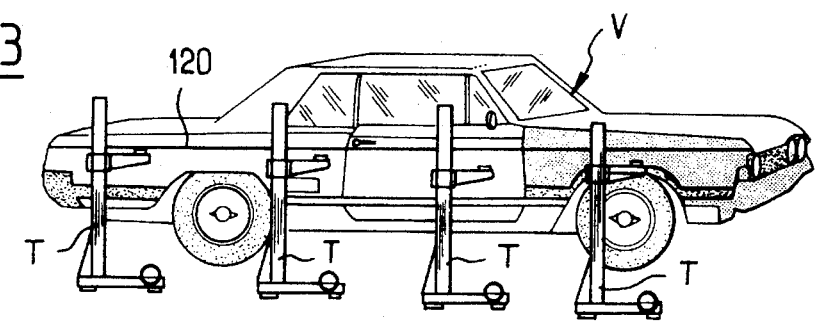
FIG_3
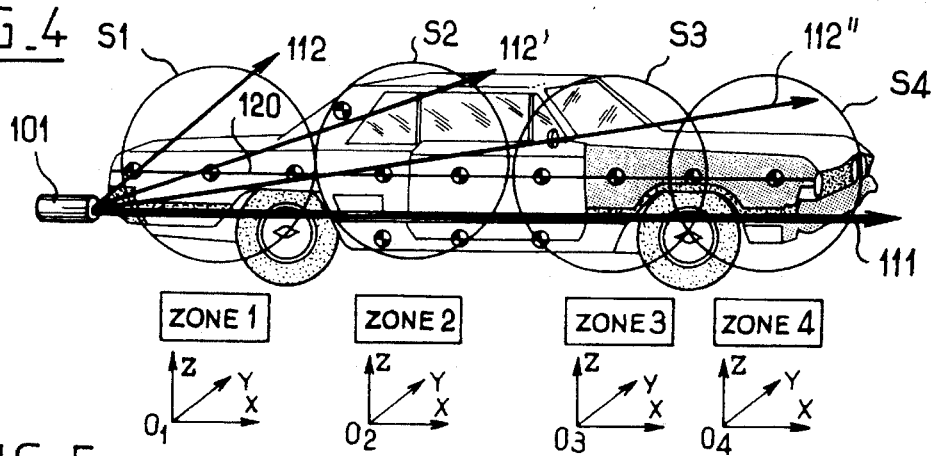
FIG_4
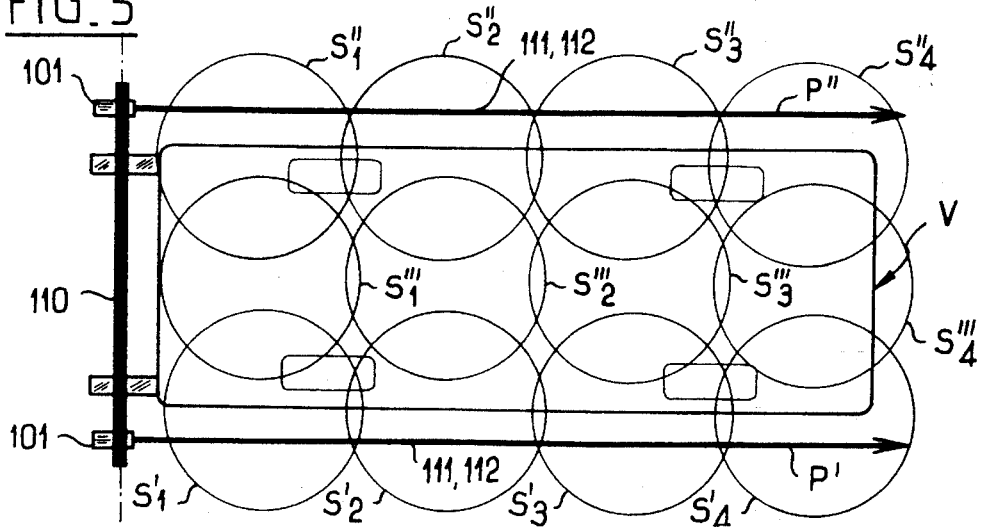
FIG_5

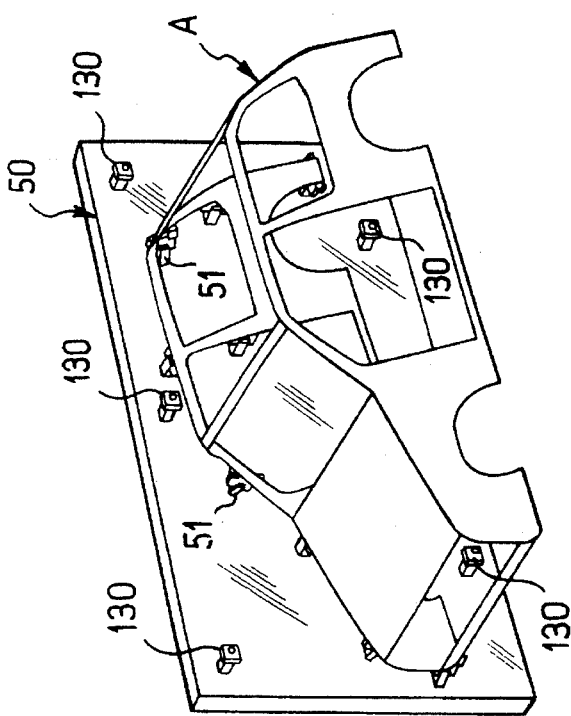
FIG_6
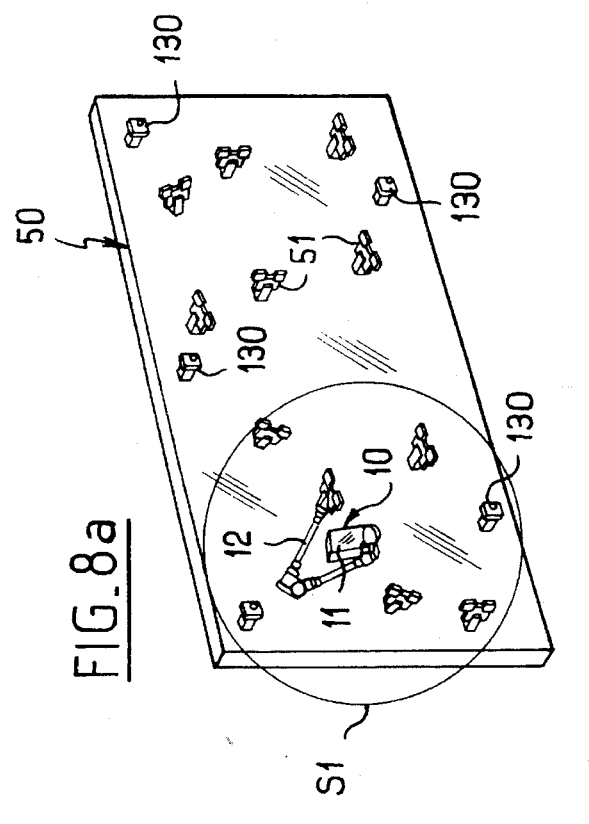
FIG_8a
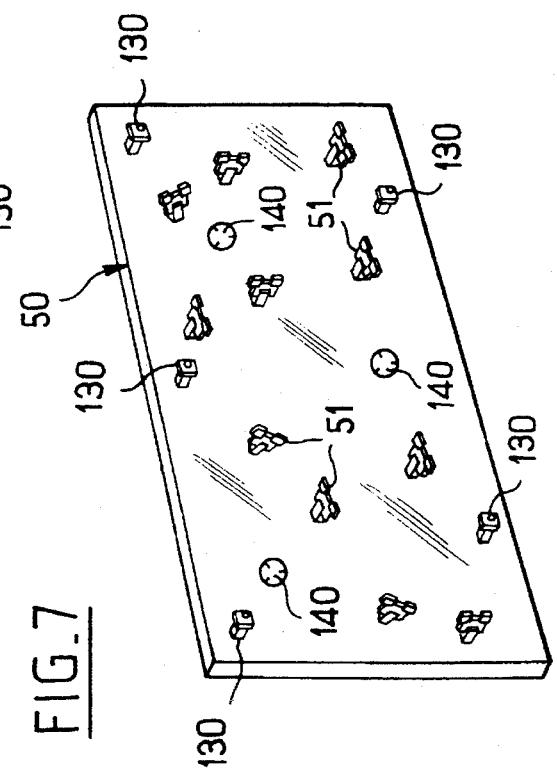
FIG_7

1

POSITION-MARKING METHOD FOR A MACHINE THAT MEASURES IN THREE DIMENSIONS, AND APPARATUS FOR IMPLEMENTING THE METHOD

The present invention relates to the field of techniques for measuring the shape and/or position of an object by means of a machine for measuring in three dimensions.

BACKGROUND OF THE INVENTION

Such machines, referred herein as "three-dimensional machines", are generally constituted by a support and a deformable arm made up of hinged arm segments, with a contact mounted at the end of the last hinged arm segment. A plurality of points on the object to be measured are then touched by means of the sensor which is movable relative to a reference coordinate system. The measurement machine is also connected to a computer which makes use of the information provided by the sensor and by position detectors associated with the arm.

The present trend is towards machines that are simultaneously compact, lightweight, and accurate. This poses problems that are particularly difficult when measuring the positions of objects inside motor vehicle bodywork.

The machines that were designed about 20 years ago are bulky and expensive (see for example documents U.S. Pat. Nos. 3,774,312, 3,774,311, 3,636,635, and 3,279,079). Furthermore, those machines are of limited application since the size of the machine determines the size of the objects that can be measured, and the cost of the machine increases rapidly with size. Because of difficulties in maintaining positioning and displacement accuracy for elements that are cantilevered out, machines of that type must also be massive throughout to ensure that they are of sufficient stiffness, such that measuring objects of large dimensions (in length or in height) requires the use of machines that are bulky, heavy, and expensive.

Machines that are simpler and easier to handle have been proposed, as illustrated in documents U.S. Pat. No. 3,944,798 and GB-A-1 498 009, or more recently in document FR-A-2 597 969. However those more recent machines are de facto more restricted as to accessible length: measurable volumes are generally limited to about 1 meter from the support of the deformable arm. As a result, if it is absolutely essential to perform measurements in a zone that is further away, then the support must be moved, and that gives rise to a loss of accuracy since the computer determines the coordinates of the contact sensor in a frame of reference based on the machine.

It might be tempting to use a guide rail and to mount the support so as to be free to move in translation on the rail. However, if it is desired to maintain high accuracy (to within two-tenths of a millimeter), then the rail must be of a section that is large enough to avoid twisting, and must therefore be heavy and bulky.

OBJECTS AND SUMMARY OF THE INVENTION

The invention seeks specifically to solve that problem by means of a position-marking technique that enables the volume that is measurable by means of a three-dimensional measuring machine to be increased while retaining high accuracy.

An object of the invention is thus to design a position-marking method, and apparatus for implementing it, to enable large volumes to be measured using a machine of small dimensions, and to enable the three-dimensional measurement machine to be displaced without losing accuracy, while keeping the design simple and the cost reasonable.

More particularly, the present invention provides a position-marking method for a measurement machine that measures in three dimensions and that is constituted by a support and a deformable arm in the form of hinged arm segments, with a contact sensor mounted at the end of the last hinged arm segment to measure the shape and/or the position of an object, said method using a computer associated with said measurement machine to determine the coordinates of the contact sensor for any position of the hinged arm segments, the method comprising the following steps performed without displacing the support of the machine:

the contact sensor is replaced with a light sensor secured at the same position;

use is made of a first position-marking axis as defined by a light beam emitted by an emitter disposed in a first position, by measuring two points on said first axis with the light sensor thereby defining a first vector;

the emitter is displaced in a plane so as to take up a second position in such a manner that the light beam it emits is coplanar and not parallel to the light beam emitted in the first position; and use is made of a second position-marking axis defined by the light beam emitted by the emitter when disposed in said second position, by measuring a point on said second axis, and by determining the projection of said point on the first position-marking axis, thereby defining a second vector, said projection being selected as the origin of a frame of reference in which the three leading vectors are constituted by said first and second vectors and by a third vector which is the result of the vector product of the second and first vectors;

and wherein a determined displacement of the support of the machine for the purpose of taking measurements in a zone that is further away requires a new frame of reference to be determined using the same steps, using the same first axis or another first axis at a known angle to said first axis, and using a new point on another second axis obtained by a new displacement of the emitter performed to keep it in the same plane, so as to determine the origin of the new frame of reference, thereby making it possible to make available a plurality of known frames of reference.

When the support of the machine is displaced in or close to a fixed plane, it is advantageous for the emitter to be displaced by pivoting about a fixed axis which is perpendicular to said fixed plane. In which case, it is possible to use a second emitter secured relative to the fixed axis carrying the first emitter, and the same steps are performed with said second emitter which is therefore displaced in a plane that is parallel to the displacement plane of the first emitter.

In a variant, it is possible to provide for the emitter to be displaced by sliding over a fixed support surface belonging to a reference block, said surface being parallel to said fixed plane.

Also preferably, the magnitude of the displacement of the machine support is determined by means of a linear measurement member such as a flat strip or an elongate bar having reference marks at known distances, said linear measurement member extending along a direction that is close to the direction of the first position-marking axis. In a variant, the magnitude of the displacement of the machine support is determined by means of pre-established reference marks associated with fixing or fastening the support of the machine on a fixed unit.

In some cases, particularly for voluminous objects and after a reference frame has been determined, it is advantageous to provide for the emitter to be repositioned in such a manner as to enable it to be displaced in another plane that is not parallel to the first plane used, and another frame of reference is determined using the same steps, optionally together with another new frame of reference following determined displacement of the support of the machine in order to take measurements in a zone that is further away in the direction of said other plane. In particular, the other plane may be perpendicular to the first plane used. It is then possible to provide for the emitter to be repositioned by being pressed against two fixed support surfaces that are mutually perpendicular and perpendicular to the first fixed support surface used, said surfaces belonging to a reference block whose rectified faces are in known orientations.

The invention also provides apparatus specially designed for implementing the above method in which one or more pivoting emitters are used, the apparatus comprising at least one emitter mounted to pivot about a fixed axis which is perpendicular to the plane in which the light beam associated with each emitter is displaced, together with a light sensor replacing the contact sensor of the arm of the measurement machine and secured in the same position as said contact sensor. In a variant having a sliding emitter, the apparatus comprises a reference block whose rectified faces are in known orientations and serve as fixed support surfaces for an emitter capable of being displaced by sliding over one of said surfaces, together with a light sensor replacing the contact sensor of the arm of the measurement machine and secured at the same position as the contact sensor.

BRIEF DESCRIPTION OF THE DRAWINGS

Other characteristics and advantages of the invention appear more clearly in the light of the following description of a particular embodiment given with reference to the accompanying drawings, in which:

FIG. 1 shows a preferred implementation of the method of the invention using a light beam emitter a laser beam) that is pivotally mounted (in this case in a vertical plane), together with a flat strip of distance markers extending in a direction close to that of the light beam, the three-dimensional machine being shown in a first position (support shown in solid lines) with an associated frame of reference referred to the machine, and in a second position (support shown in dashed lines) with another associated frame of reference which is also positioned relative to the initial light beam;

FIG. 2 is a diagram showing the steps in constructing a frame of reference marked by the machine and using the method of the invention;

FIG. 3 shows a moving support for the three-dimensional machine which is displaced past the object concerned (in this case a motor vehicle), and FIG. 4 shows the various measurement volumes that are obtained for the positions occupied by the above-mentioned moving support;

FIG. 5 is a diagrammatic plan view showing the various measurement volumes that can be obtained using two emitters referred to a common axis, and disposed on either side of the vehicle, the volumes of the middle row (internal measurements) being obtained with a rail (not shown) or by offsetting from previously measured points;

FIG. 6 shows a bench for assembling vehicle bodywork, with the front panel removed;

FIG. 7 shows the inside face of the middle panel, with its three locations associated with fixing the machine support, FIGS. 8a, 8b, and 8c showing the machine in said locations;

MORE DETAILED DESCRIPTION

Figure 8C:
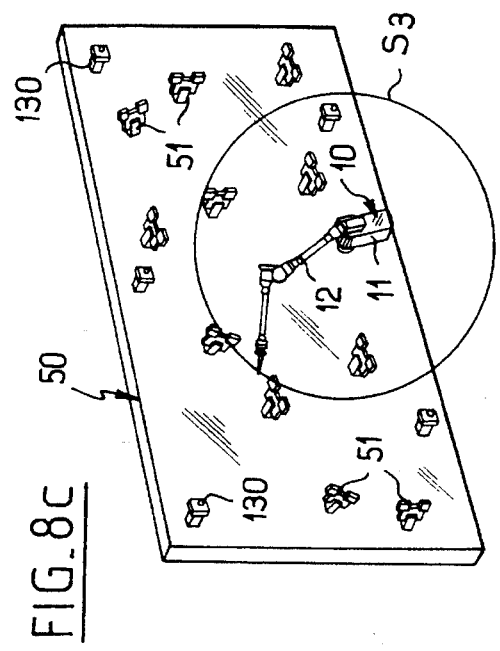

In FIG. 1 there can be seen a three-dimensional measurement machine 10 of known type designed to measure shapes and/or positions on an object A symbolized by chain-dotted lines. The machine 10 shown herein is constituted by a support 1 and a deformable arm 12 made up of hinged arm segments 13, 14, 15, and 16, together with a contact sensor 17 mounted at the end of the last hinged arm segment 16 for the purpose of making measurements on the object A. The shape and/or position of the object A can be measured by moving the hinged arm so as to bring the contact sensor 17 into contact with a determined point of the object A. The machine 10 shown herein has six axes of rotation 20, 21, 22, 23, 24, and 25, which axes are locked against rotation by progressive abutments that are not shown. A computer 30 connected to the measurement machine 10 by means of a cable 31 is associated with said measurement machine to determine the coordinates of the contact sensor 17 (assumed to be a point) for any position of the hinged arm segments making up the deformable arm 12. The computer 30 shown is a portable microcomputer having a keyboard 34 and a screen 32 having a portion 33 used for displaying the Cartesian coordinates X, Y, and Z of the sensor 17 in the frame of reference of the measurement machine 10. Movements of the sensor 17 are controlled by rotating the last two encoders of the deformable arm 12 that are associated with the axes 24 and 25, and the screen 32 includes a reference mark 35 having an abscissa axis which corresponds to horizontal movement of the encoder associated with the axis 25, and an ordinate axis which corresponds to vertical movement of the encoder associated with the axis 24. The operator can use the keyboard 34 of the computer to display the Cartesian coordinates of the sensor 17 at any moment, and in this case a remote control button 40 is also provided to make it possible to avoid using the keyboard 34: while holding the deformable arm of the three-dimensional measurement machine 10 in place, the operator can then readily simultaneously input the command when the sensor 17 is in contact with the object A at the point to be measured. Under such circumstances, the operator can monitor proceedings on the screen 32 which displays a cursor that moves horizontally and vertically relative to the reference mark 35. When the three-dimensional measurement machine 10 is in the position shown in solid lines, it can perform shape and/or position measurements within a volume defined by a sphere S1. It should be observed that the contact sensor 17 of the machine is replaced in this case by a light beam sensor 10 secured to occupy the same position as otherwise occupied by the contact sensor, said light beam sensor serving to implement the position-marking method of the invention, which method makes it possible to displace the three-dimensional machine and then perform measurements in a new volume.

In FIG. 1, the support 11 of the machine is shown by means of dashed lines in a new position, thereby enabling the measurement machine to use its contact sensor 17 to perform measurements in a new volume as defined by a sphere S2. This situation arises frequently when the object A is bulky, or very long, and insofar as there is a need to make measurements in a zone that is further away, lying outside the first volume as defined by the sphere S1.

There follows an explanation of how the position-marking method of the invention is implemented whereby it becomes possible to measure large volumes using a machine of small dimensions but without thereby losing accuracy.

In the method, it is possible to establish known frames of reference for different positions of the measurement machine support, with each of these frames of reference being referred to a fixed position-marking axis.

The description begins with the way in which a reference frame is established for a first position of the measurement machine 10 by using a beam sensor 100 mounted in the place of and instead of the contact sensor of the three-dimensional machine, and also using a light beam emitter 101 (preferably a laser beam emitter), said emitter being mounted on a support 102 in such a manner as to enable it to be moved so that the light beam can be displaced to some other position in which it is coplanar but not parallel to the beam as emitted in the first position.

In FIG. 1, an emitter 101 is provided that is pivotally mounted on its support 102 so as to be capable of being pivoted about a fixed axis 110 that is perpendicular to the fixed plane in which the light beam propagates in the various angular positions of the emitter 101. As shown in FIG. 1, the support 102 stands on the ground or on a support block having a horizontal face, such that the fixed plane in which the light beam moves is vertical in this case. As explained below, it is possible to provide for other types of displacement for the emitter 101, in particular displacements by sliding over a fixed support surface. The beam sensor 100 replaces the contact sensor of the machine's hinged arm by being secured at the same position as the contact sensor, i.e., when the beam sensor is constituted by a microcamera, its light sensitive grid which has a radius of about 3 cm is in the form of a circular disk centered on the point previously occupied by the contact sensor 17 prior to being substituted therefor.

The method of establishing a frame of reference for the position occupied by the support of the machine is described below with reference to FIG. 1 and to the construction shown diagrammatically in FIG. 2.

Initially, a first position-marking axis 111 is used as defined by the light beam emitted by the emitter 101 while it is disposed in a first position, with this being done by measuring two points $A_{11}$ and $A_{12}$ on said first axis by means of the light sensor 100. The computer 30 uses the resulting data to define a first vector V1.

Thereafter the emitter 101 is moved in a plane (in this case a vertical plane) so as to take up a second position in which the light beam is coplanar and not parallel to the beam emitted in the first position. Since the emitter is pivotally mounted, the second position is obtained in this case by rotation through an angle a about the fixed axis 110. A second position-marking axis 112 is then used as defined by the light beam emitted by the emitter 101 while in its second position, with a point $B_1$ being measured on the second axis. This information makes it possible to determine a projection $O_1$ of the point $B_1$ on the first position-marking axis 111, the projection preferably being orthogonal so as to simplify the calculations. The point $O_1$ is then selected as the origin of a frame of reference whose three leading vectors are constituted by the first vector V1, a second vector V2 extending from $O_1$ to $B_1$, and by a third vector V3 which is the result of the vector product of the second and first vectors. This provides a frame of reference marked $O_1X$, $O_1Y$, $O_1Z$.

The support 11 of the machine 10 is then displaced for the purpose of taking measurements in a zone that is further away, thus requiring a new frame of reference to be determined, with this being done using the same technique. The displacement is "determined", i.e. a linear measurement is available that represents the displacement of the machine support, this measurement being preferably performed in substantially the same direction as said displacement. In this case, a flat or shaped elongate strip 120 is provided that has reference marks 121 at known distances, said flat or shaped strip extending in a direction that is close to the direction of the first position-marking axis 111. The elongate flat or shaped strip may be constituted, for example, by a conventional type of measurement tape, or by a wire drawn from a housing, or if necessary by a solid bar (which nevertheless suffers from the drawback of being bulkier). More generally, the magnitude of the displacement of the machine support is determined by means of a linear measurement member, and this may be done by any system that enables linear measurements to be taken without making contact, e.g. a laser interferometer. The linear measurement member thus makes it possible to establish how far the machine support has moved in translation after being displaced. It should be observed that it is not essential in any way for the direction established by the linear measurement member to be parallel to the plane in which the light beams are displaced, given that a small amount of divergence will give rise to a minimal amount of error that is in any event correctable since the relative distances between the reference marks are known and the concept of measurement in the machine's frame of reference is retained at all times. Thus, a first axis 111' is used which may coincide with the first axis 111 as used during the preceding determination (as shown), or which may be some other first axis at a known angle relative to said first axis 111. Two points $A_{21}$ and $A_{22}$ on said new first axis are then measured using the light sensor 100 so as to determine a new first vector. Thereafter, the emitter 101 is displaced within its plane (in this case by being rotated about the axis 110) so as to move the beam to a second position that defines a second axis 112' (which in this case does not coincide with the second axis 112 used in the preceding determination), thus making it possible, after measuring a point $B_2$ on this new second axis 112', to determine the origin $O_2$ of a new frame of reference $O_2X$, $O_2Y$, $O_2Z$. The process can be repeated, thereby providing a plurality of known frames of reference.

FIGS. 3 and 4 show how the above-described position-marking method is implemented in associated with an object that is constituted in this case by a motor vehicle V. In FIG. 3, there can be seen the various positions of a moving support T on which the support 11 of the above-described three-dimensional machine can be placed. The moving support T may run on casters, for example to enable it to be moved along the vehicle V. It should be observed that there is a strip 120 mounted on the vehicle V, which strip has reference marks (not visible in the figure) at known distances. FIG. 4 is a diagram showing the various frames of reference that can then be defined for each measurement volume S1, S2, S3, and S4 within which it is possible to measure some of the outside points of the vehicle V. FIG. 4 shows a first position-marking axis 111 and a plurality of second position-marking axes 112, 112', 112". In each of the zones concerned, the process for determining a frame of reference is implemented as described above, thereby making it possible in each of the zones concerned, 1, 2, 3, and 4, to determine the following frames of reference with ease and with great accuracy $(O_1X, O_1Y, O_1Z)$, $(O_2X, O_2Y, O_2Z)$, $(O_3X, O_3Y, O_3Z)$, and $(O_4X, O_4Y, O_4Z)$.

In the application shown in FIGS. 3 and 4, the mode of scanning used by the laser beam is essentially vertical. It may then be of interest to be able to double up the measurements by performing shape and/or position measurements of the same object V but on the other side of the object, and using the same apparatus.

One way of doing this is shown diagrammatically in FIG. 5 which is a plan view. This is done by using a second emitter 101 secured to the same fixed axis 110 as carries the first emitter. The same steps are then performed using the second emitter which is thus displaced in a plane P" parallel to the displacement plane P' of the first emitter. Naturally, it is important to ensure that the initial angular settings of the emitters 101 relative to the axis are the same to within good accuracy. In the plane view, the first and second position-marking axes 111 and 112 associated with each emitter 101 lie in parallel vertical planes P' and P" that extend on either side of the vehicle V on which shape and/or position measurements are being performed. By using the technique described above, it becomes possible to perform measurements accurately in successive measurement volumes S'1, S'2, S'3, S'4 and also S"1, S"2, S"3, and S"4. If it is desired to perform measurements inside the vehicle, along a middle zone thereof, using measurement volumes S'"1, S'"2, S'"3, and S'"4, it would then be possible to use a support rail (not shown) or else by offsetting from previously measured points.

Figure 8B:
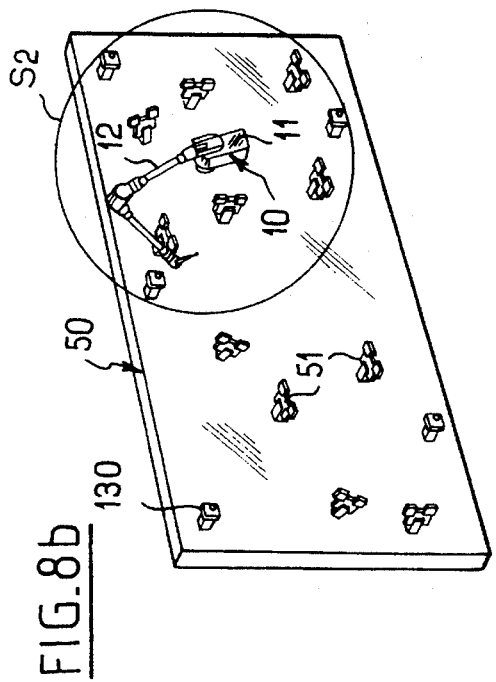
Figure 9:
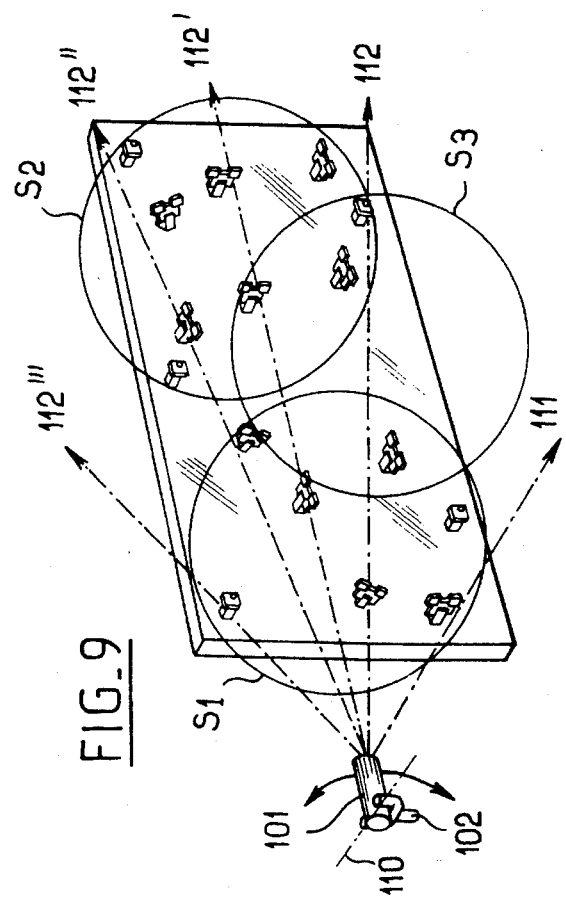
FIG. 9 shows how the use of a pivoting emitter makes it possible to obtain accurate position-marking in each of the volumes associated with the above-mentioned locations.

FIG. 6 shows a portion of a bench for assembling vehicle bodywork, with the front panel of the bench being removed, its rear panel 50 including clamps 51 for holding the components of the bodywork A that is to be assembled. The front panel is shown in FIG. 7 and is provided not only with clamps 51, but also with three locations 140 associated with fixing the support 11 of the above-described three-dimensional machine, with an appropriate one of these three locations being selected to perform measurements in the desired volume S1, S2, or S3, as shown in FIGS. 8a, 8b, and 8c. Members 130 mounted on the panel 50 constitute reference points for facilitating position-marking. These points can be detected by the laser beam of the emitter, thereby making it possible to determine the position of the beam relative to the object to be measured, and thus to include intermediate means in the position-marking method of the invention, simplifying the calculations to be performed. FIG. 9 thus shows the use of a pivoting emitter 101 for application of the method described above, so as to achieve accurate position-marking in each of the volumes associated with the above-mentioned positions. For example, the various position-marking axes used when determining the frames of reference are marked 111, 112', 112", and 112'".

As a variant to using one or more pivotally-mounted emitters, it is possible to use at least one emitter that is displaced by sliding over a fixed support surface, said surface being parallel to the fixed plane in which, or close to which, the three-dimensional machine support is displaced.

It is then possible to use a reference plate that is fitted in the vicinity of a corner with support surfaces making it possible to guarantee that the position of the first position-marking axis is indeed constant, with the second axis being obtained merely by sliding over the support surface to a second position in which the light beam is coplanar and not parallel to the beam as emitted in the first position.

Figure 10:
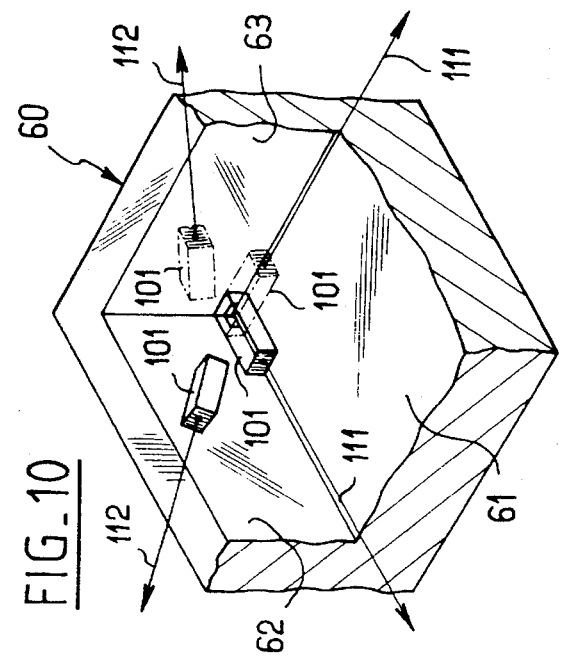
FIG. 10 is a fragmentary view of a reference block enabling a sliding emitter to be easily repositioned, in this case in another plane that is perpendicular to the plane first used.

FIG. 10 shows a support block having additional facilities insofar as it makes it possible to reposition the emitter in such a manner as to enable it to be displaced in another plane that is not parallel to the first plane used (in this case the other plane is perpendicular to the first plane used), and another reference frame can be determined using the same steps, optionally together with another new reference frame following determined displacement of the machine support for taking measurements in a zone that is further away in the direction of said other plane. The reference block 60 thus includes rectified faces 61, 62, and 63 having known orientations and preferably defining a base frame of reference defined by three right angles.

In this case, the emitter 101 which is the form of a housing constituting a rectangular parallelepiped is initially pressed against all three reference faces to define the first position-marking axis 111, and is then displaced by sliding over a lateral face 62 to determine the second position-marking axis 112. Thereafter, the emitter 101 is repositioned to another position shown in chain-dotted lines to define a new first axis 111, after which it is moved to define a new second position-marking axis 112 by being slid over side support face 63. By construction, the light beam plane is then exactly perpendicular to the preceding plane, thereby making it possible to go very quickly to a new measurement plane perpendicular to the first. Thus, by using such a reference block having rectified faces it is possible to work progressively around the object. Naturally, there are various ways in which such a reference block can be made, and in a variant it would be possible to use a cube or more generally a polyhedron having rectified faces optionally provided with strips in accurately determined angular positions against which the emitter can be pressed.

The invention thus provides a position-marking technique that makes it possible to increase the volume measurable by a three-dimensional measuring machine while retaining high measurement accuracy. Using a measurement machine of the kind shown in the figures, it is possible to obtain measurement accuracy of the order of one-tenth of a millimeter while the machine support is displaced over 4 or 5 meters. The apparatus for implementing the invention is, in addition, simple in design and reasonable in cost. The position-marking method and apparatus of the invention make it easy to recreate a new known frame of reference very quickly each time that it is necessary to displace the measurement machine.

The invention is not limited to the embodiments described above, but on the contrary it extends to any variant that uses equivalent means to reproduce the essential characteristics specified above.

We claim:

1. A position-marking method for a measurement machine that measures in three dimensions and that is constituted by a support and a deformable arm in the form of hinged arm segments, with a contact sensor mounted at the end of the last hinged arm segment to measure the shape and/or the position of an object, said method using a computer to determine the coordinates of the contact sensor for any position of the hinged arm segments, the method comprising the following steps performed without displacing the support of the machine:

the contact sensor is replaced with a light sensor secured at the same position;

use is made of a first position-marking axis as defined by a light beam emitted by an emitter disposed in a first position, by measuring two points on said first axis with the light sensor thereby defining a first vector;

the emitter is displaced in a plane so as to take up a second position in such a manner that the light beam it emits is coplanar and not parallel to the light beam emitted in the first position; and use is made of a second position-marking axis defined by the light beam emitted by the emitter when disposed in said second position, by measuring a point on said second axis, and by determining a projection of said point of said second axis on the first position-marking axis, thereby defining a second vector, said projection being selected as the origin of a frame of reference having three leading vectors which are constituted by said first and second vectors and by a third vector which is the result of a vector product of the second and first vectors;

and wherein a determined displacement of the support of the machine for the purpose of taking measurements in a zone that is further away requires a new frame of reference to be determined using the same steps, using the same first axis or another first axis at a known angle to said first axis, and using a new point on another second axis obtained by a new displacement of the emitter performed to keep it in the same plane, so as to determine the origin of the new frame of reference, thereby making it possible to make available a plurality of known frames of references.

2. A method according to claim 1, in which the support of the machine is displaced in or in the vicinity of a fixed plane, wherein the emitter is displaced by pivoting about a fixed axis which is perpendicular to said fixed plane.

3. A method according to claim 2, wherein use is made of a second emitter secured relative to the fixed axis carrying the first emitter, and the same steps are performed with said second emitter which is therefore displaced in a plane that is parallel to the displacement plane of the first emitter.

4. Apparatus for implementing the method of claim 2, comprising at least one emitter mounted to pivot about a fixed axis which is perpendicular to the plane in which the light beam associated with each emitter is displaced, together with a light sensor replacing the contact sensor of the arm of the measurement machine and secured in the same position as said contact sensor.

5. A method according to claim 1, wherein the magnitude of the displacement of the machine support is determined by means of a linear measurement member such as a flat strip or an elongate bar having reference marks at known distances, said linear measurement member extending along a direction that is close to the direction of the first position-marking axis.

6. A method according to claim 1, wherein the magnitude of the displacement of the machine support is determined by means of pre-established reference marks associated with fixing or fastening the support of the machine on a fixed unit.

7. A method according to claim 1, wherein, after a reference frame has been determined, the emitter is repositioned in such a manner as to enable it to be displaced in another plane that is not parallel to the first plane used, and another frame of reference is determined using the same steps, optionally together with another new frame of reference following determined displacement of the support of the machine in order to take measurements in a zone that is further away in the direction of said other plane.

8. A method according to claim 7, wherein the other plane is perpendicular to the first plane used.

9. A method according to claim 1, in which the support of the machine is displaced in or in the vicinity of a fixed plane, wherein the emitter is displaced by sliding over a fixed support surface belonging to a reference block, said surface being parallel to said fixed plane.

10. A method according to claim 9, wherein the emitter is repositioned by being pressed against two fixed support surfaces that are mutually perpendicular and perpendicular to the first fixed support surface used, said surfaces belonging to a reference block whose rectified faces are in known orientations.

11. Apparatus for implementing the method of claim 9, comprising a reference block whose rectified faces are in known orientations and serve as fixed support surfaces for an emitter capable of being displaced by sliding over one of said surfaces, together with a light sensor replacing the contact sensor of the arm of the measurement machine and secured at the same position as the contact sensor.

* * * * *